March 10, 1959 — C. L. CUMMINS — 2,876,876
DIESEL ENGINE BRAKING CONTROL
Filed Nov. 25, 1955 — 5 Sheets-Sheet 1
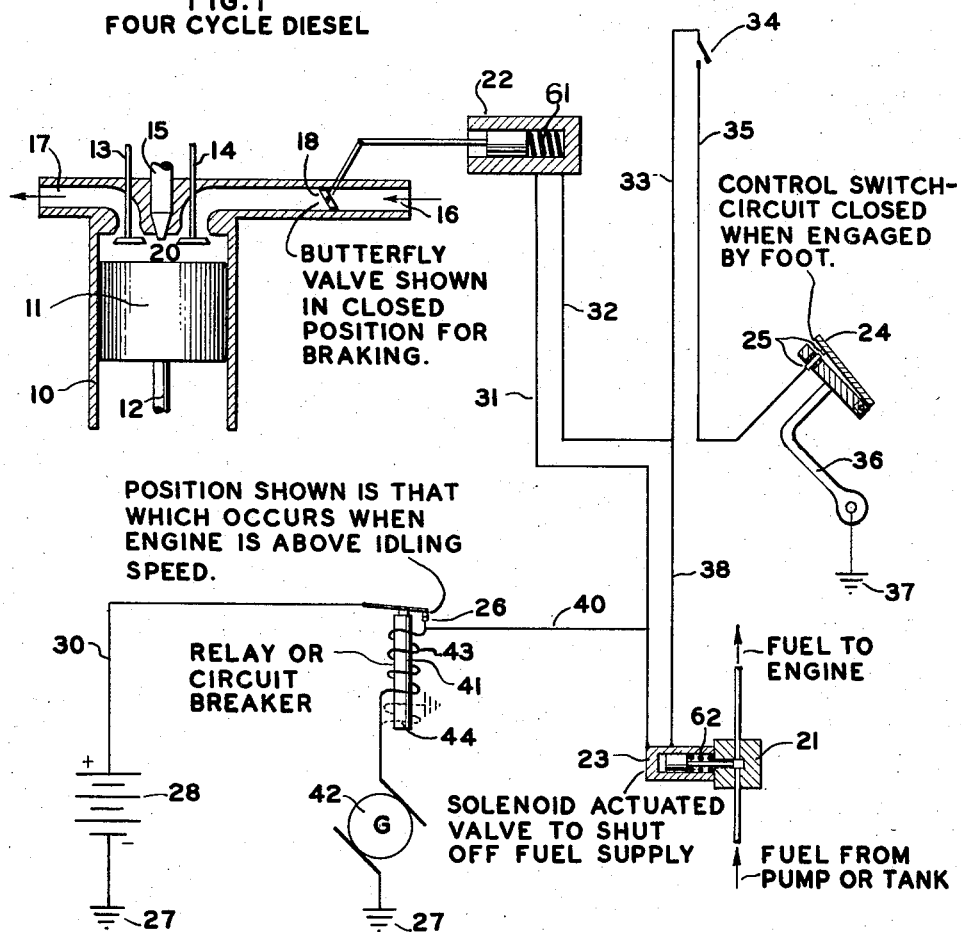
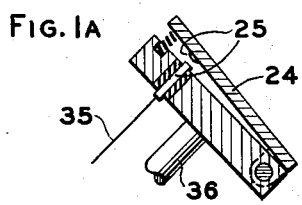
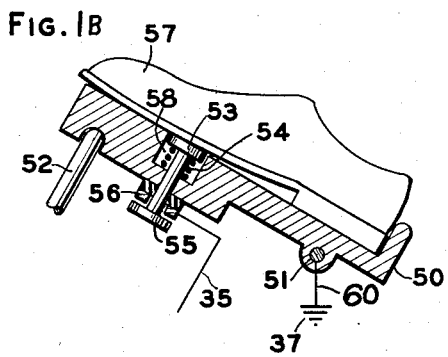
INVENTOR
CLESSIE L. CUMMINS
ATTORNEY

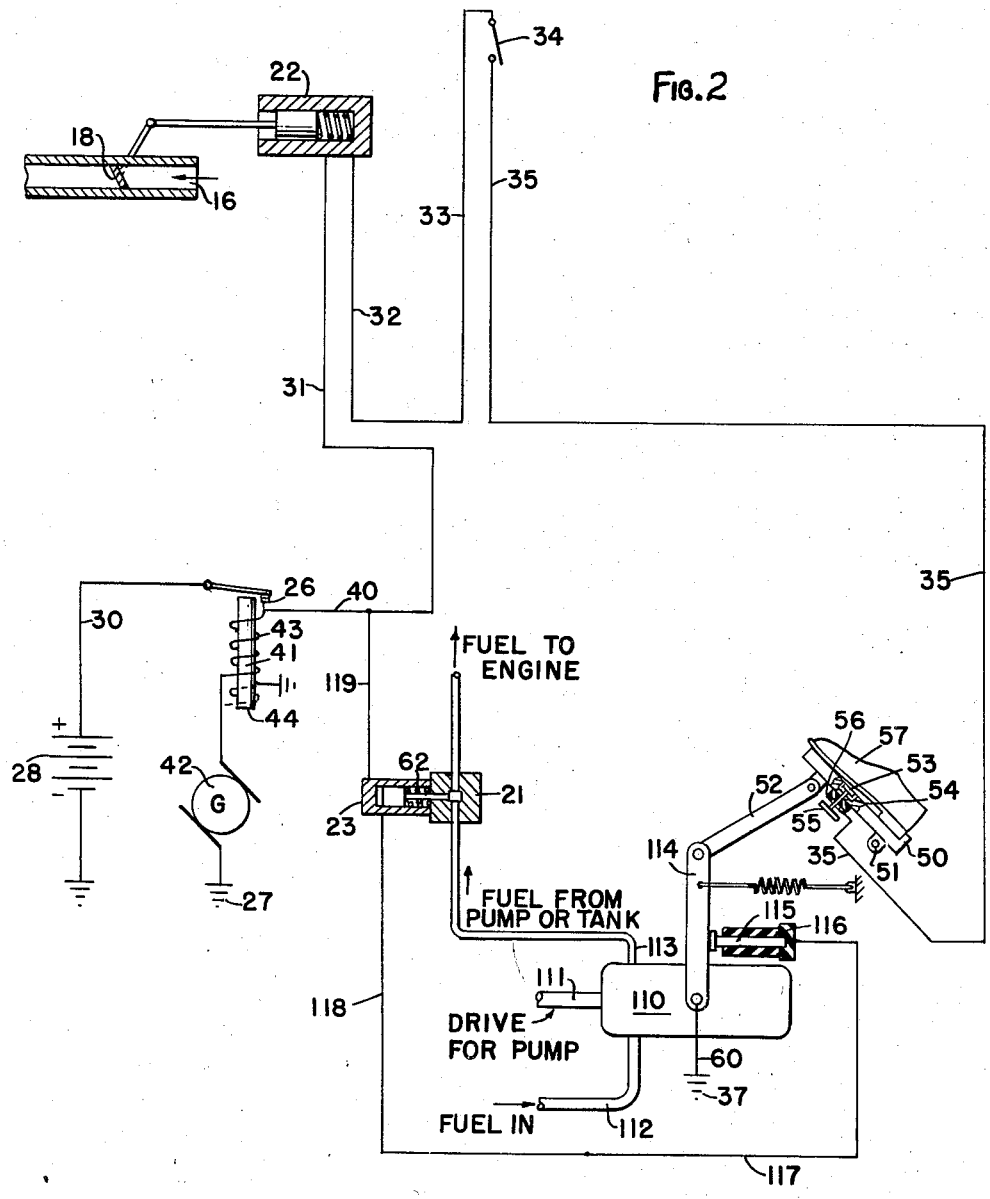

March 10, 1959

C. L. CUMMINS 2,876,876

DIESEL ENGINE BRAKING CONTROL

Filed Nov. 25, 1955

FOUR CYCLE DIESEL WITH POSITIVE DISPLACEMENT SUPERCHARGER

FOUR CYCLE DIESEL WITH TURBOSUPERCHARGER

INVENTOR
CLESSIE L. CUMMINS
ATTORNEY

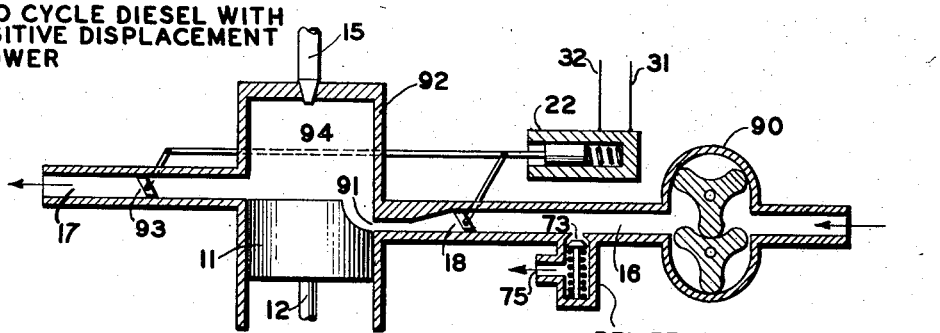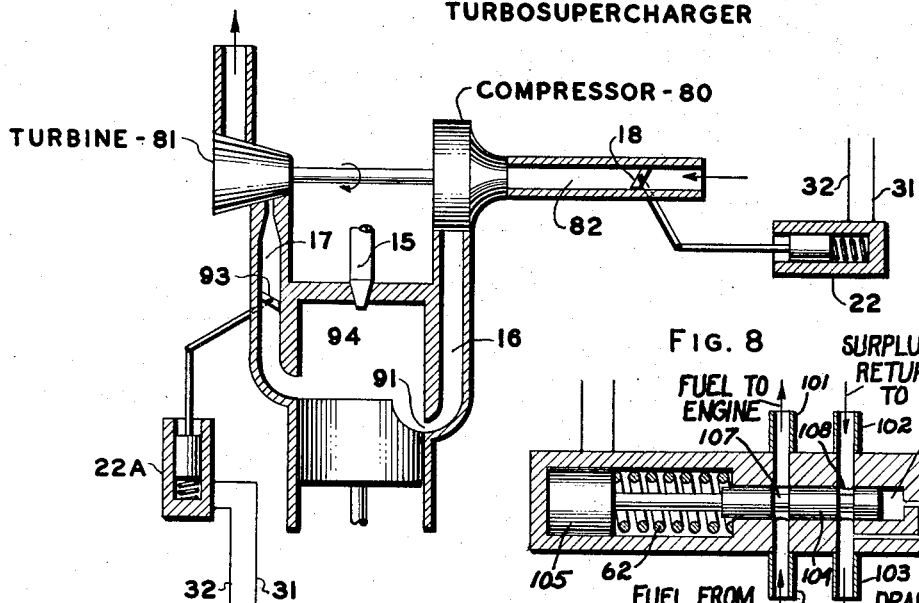

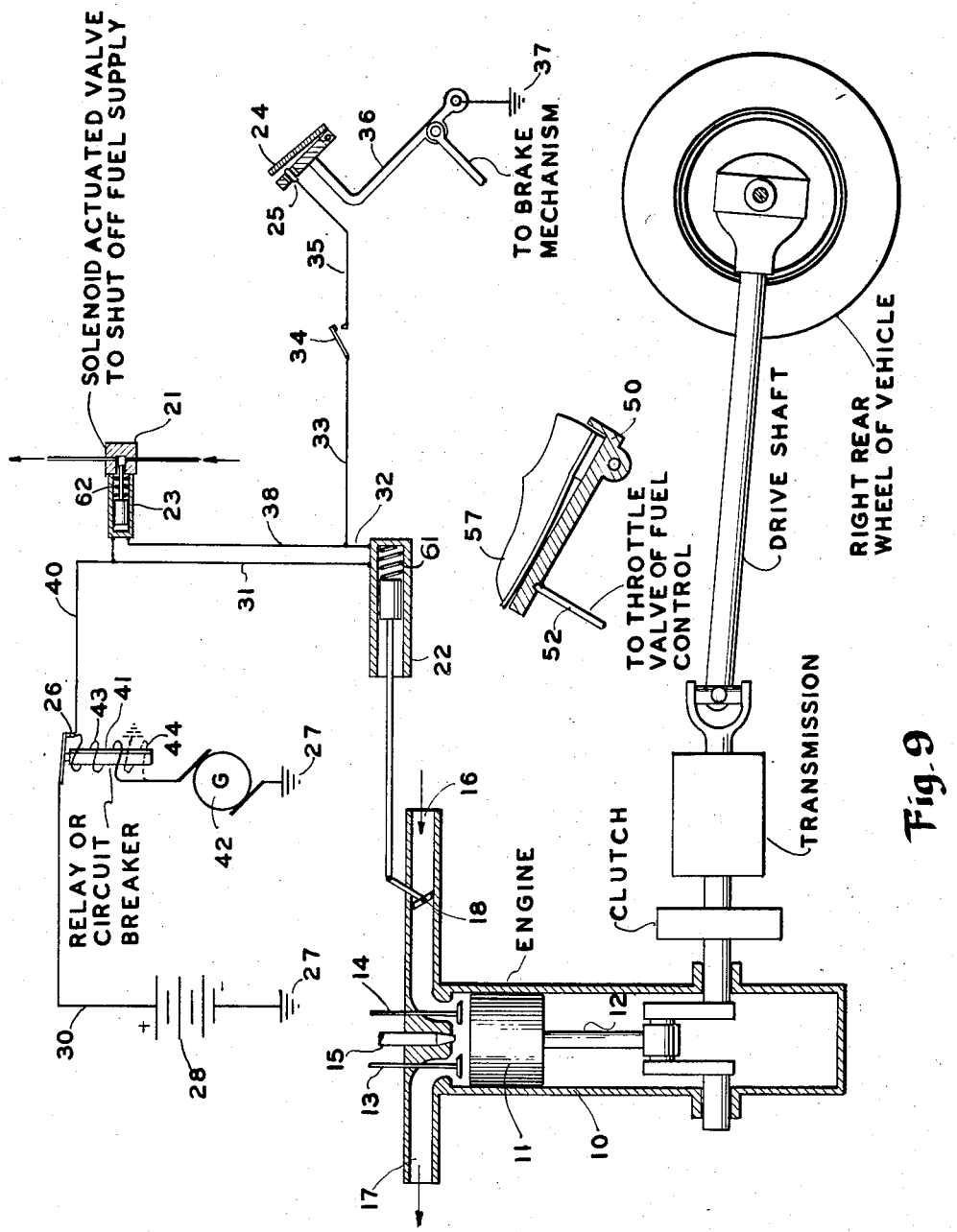

United States Patent Office 2,876,876
Patented Mar. 10, 1959

2,876,876

DIESEL ENGINE BRAKING CONTROL

Clessie L. Cummins, Sausalito, Calif.

Application November 25, 1955, Serial No. 548,901

11 Claims. (Cl. 192—3)

This invention relates to improvements in braking mechanisms for vehicles propelled by certain types of internal combustion engines.

In particular, the invention provides auxiliary braking power for vehicles propelled by compression ignition engines of the so-called diesel type, or for any other type engine having free breathing or substantially unthrottled air intake into its cylinders. For the sake of brevity I shall refer in this patent to such engines as of the diesel type, although some of them are not true diesels, but they do have the characteristic of a true diesel in having substantially unthrottled air intake into the cylinders.

Heretofore, many problems have arisen in connection with the braking of vehicles propelled by engines of the type above described because full reliance had to be placed on the wheel brakes, since the engine itself, when rotated through the drive shaft by the inertia and mass of the forward moving vehicle, offered mainly only the resistance due to the friction losses of the engine. In some engines even this friction effect was offset by the power derived from the burning of the fuel being fed to the engine by leaking or poorly adjusted pumps or governors. Thus, the meager auxiliary braking from the friction losses has placed these vehicles completely at the mercy of the wheel brakes.

Today, as for many years past, failure of the brakes accounts for the frequent accidents caused by runaway trucks, busses and truck-trailer combinations on hills or in traffic. Each such accident probably could have been avoided if the vehicle had been in one of its lower gear ratios and had had means to convert its engine into a pump so it could have served as an auxiliary brake.

The added burden on the wheel brakes of having to do the whole job of arresting the forward movement of the vehicle has meant that replacement of the brake shoes or lining has had to be done frequently. In spite of the heavy cost of brake relining and the tie-up of the vehicle while this was being done, no satisfactory solution to the problem has been worked out heretofore. Also, the rapid wear of the brake lining places such a vehicle in a vulnerable state at frequent periods as the operator seeks economy by stretching out the interval between brake relining jobs.

The problem of getting no material braking assistance from the engine is even more noticeable today with the tremendous growth in the use of large truck-trailer units and of busses operating on the highways at speeds of 60 to 70 miles an hour, sandwiched in with hundreds of passenger cars and other trucks, requiring the driver to decelerate frequently and to make frequent application of the wheel brakes to avoid collisions.

An example of the practical problems that have been faced for years by the drivers of diesel-powered vehicles is this: On a long down-grade, such as the Donner Pass Road in California, with a vehicle powered with a diesel engine, two problems in braking are everpresent in the driver's mind. One problem is to use the brakes as little as possible on this long descent to prevent their overheating. The driver knows that over-heating may result in a complete loss of brakes, and that this will leave the vehicle with no other means of effectively checking its speed so it will run wild on the highway and end up in an accident. This leads the driver to do what is called "pumping" the brakes. It means applying the wheel brakes for short periods to check the vehicle's speed and allowing intervals in between applications for the brake drums and shoes to cool. "Pumping" the brakes creates the second problem, because the driver may use up all the available air supply in his frequent application and release of the brakes. This exhaustion of the air supply before reaching the bottom of the grade also leaves the vehicle without any effective brakes. The hand or parking brakes are not adequate for such service, and there is no mechanical linkage on these large vehicles by which the brakes can be applied when the air supply is exhausted or lost and the air brakes cease to function. An instance of this type of brake failure occurred on October 19, 1955, when a heavily loaded truck-trailer ran down a hill into the town of Cumberland, Maryland, killing five people. The driver said afterward, "He took to the center of the road and gunned his engine in the hope of raising some air pressure in the brake system." The report of the accident said, "Meyers estimated he was doing 80 or 90 miles an hour when he roared through Frostburg, 11 miles west of Cumberland. Many trucks have gotten loose on the steep grade and drivers usually ditched them around Eckhardt Mines."

The driver knows, too, that overheating of the vehicle's brakes may result in a fire which not infrequently spreads to the vehicle's contents, and if the contents are something highly inflammable or explosive, the danger extends not only to himself, but to others on the highway and to property adjacent the highway. Also because the brake drum and tire rim are attached, overheating of the brakes heats up the tires and shortens their life and sometimes causes blowouts.

It is therefore the broad object of my invention to solve the foregoing problems, as well as others not yet mentioned. I have done this by providing means for automatically converting the so-called diesel-type engine into a pump so that it provides a powerful braking unit during that period of the braking cycle from the instant the driver wishes to decelerate the vehicle, down to the time when the vehicle has been slowed to just above the normal idling speed of the engine. When the latter speed is reached, my device restores the engine to its normal operating condition. Thus, in this critical speed range, where most of the difficult braking conditions are encountered, my invention provides the driver with practically automatic supplementary auxiliary braking capacity. The net result is that the driver is able to accomplish with the engine much of the braking needed in driving, and the wheel brakes are used less frequently and not for such long periods as to burn out or to exhaust the air supply because the driver was "pumping" the brakes.

In addition to the foregoing, there are other significant and important benefits which flow from the use of my invention in the operation of vehicles powered by these so-called diesel engines. I shall name some of these benefits and then refer to each in turn. They are added fuel economy, less frequent oil changes, less frequent engine overhauls, aid in shifting gears in the transmission, a form of "dead man" control, and less driver fatigue.

A very important benefit of the new combination by which I effect my invention is the matter of added fuel economy. The competitive situation is such in the trucking industry today that a saving in fuel cost of only a fraction of a cent per mile can mean the difference between profit or loss to the operator. It is therefore an object of my invention, when used in its preferred form, to provide automatic means for shutting off the fuel to the engine whenever the driver actuates the control for converting the engine into a pump, or releases the foot throttle.

A benefit of thus shutting off the fuel to the engine is that less frequent oil changes and engine overhauls are needed. This comes about because when the engine is converted into a braking force, it becomes in effect a vacuum pump. Being rotated as a vacuum pump the compression does not reach an igniting pressure, and, besides, no air to support combustion is coming into the cylinders, so any fuel getting into the cylinders (due to leaking or poorly adjusted pumps or governors) will wash the lubricating oil off the cylinder walls and will pass down the walls into the crankcase. Stuck pistons and damaged bearings are the result. Thus the importance in the preferred form of my invention of having the fuel shut off whenever the engine is being used as a brake.

Another benefit of my new combination is the aid it gives the driver in shifting gears. Here the important consideration is in accomplishing the shift to a higher gear in as short a time interval as possible. This becomes especially important with a heavily loaded vehicle while ascending any grade where the rise is substantially continuous. In climbing, the engine must be kept revolving in the speed range which allows it to deliver its maximum torque. The driver's aim is always to shift into as high a gear as possible, but the problem comes each time the driver attempts a shift to a higher gear.

The heavy multi-ratio transmissions in trucks do not usually have synchro-mesh. So to accomplish a shift of gears it is necessary, at the instant of the shift, that both the driving and the driven gears in the transmission shall be rotating at like speeds. Suppose the driver starts the truck in the proper low gear and speeds the engine up to its top governed speed of, say, 2500 R. P. M., which could bring the truck up to about 4 miles an hour. The clutch then is disengaged and the throttle is closed. The driver must wait for the engine with its heavy flywheel and the driving gear in the transmission to slow down from 2500 R. P. M. to meshing speed with the driven gear in the transmission which is being rotated at vehicle speed. Two things are occurring while the clutch is disengaged. The vehicle, being on an ascending grade, is losing speed, so the driven gear in the transmission is slowing down. The engine, having its throttle closed, is slowing down. The difficulty comes because the engine (where a diesel type) does not slow down fast enough and the driver finds that by the time the engine is slowed down to meshing speed of the transmission, the vehicle has slowed down too much and, if the clutch were engaged, would impose a heavier load on the engine than the engine could pull at such a low R. P. M. It is not uncommon for drivers to try over a considerable distance to get into the next higher gear. The trouble is that the engine coasts for seconds longer than it should and the forward momentum of the vehicle is lost by the time the gears can be meshed. My invention solves this problem by providing means to convert the engine into a pump, as previously described, and this has the effect of quickly reducing the R. P. M. of the engine. The shift of the transmission to the next higher gear ratio then, by double clutching, is made seconds earlier than has been possible heretofore, and is made before the forward momentum of the vehicle has been lost. The net effect of my invention is to enable the driver to shift to as high a gear ratio as is possible on a particular hill rather than for the truck to have to climb the hill in a low ratio because of inability to get into a higher ratio.

Another benefit of my invention is to provide a form of "dead-man control" to the extent that if the driver loses consciousness, is thrown out of the cab, or for any other reason removes his foot from the foot throttle with the vehicle in motion and in gear, the engine will automatically act as a braking force of considerable value until the vehicle slows down to the idling speed of the engine. At this speed it is not the instrument of danger it can be when moving faster.

Another benefit of my invention is in the area of driver relaxation and satisfaction. The driver is able to approach his work with a greater feeling of assurance for the knows that his vehicle has greater braking power than it had before, that in many cases he can shift its gears under conditions impossible before, and that he can drive with an economy of fuel not possible before. Many have forgotten that when the diesel engine was first introduced for use on trucks, one of the driver's first reactions was that he missed the braking effect he had become accustomed to with the gasoline engine.

Another benefit of my invention is to provide a control by which the driver in decelerating may select how long he will permit the vehicle's engine to rotate without acting as a brake, and to select when he will convert the engine into a major braking force. This feature of my invention is important. Many occasions arise on the highway where the driver knows a mile or two in advance that a stop will be necessary. By the control I provide, the driver can elect to allow the vehicle to coast along for the first part of the deceleration with the fuel shut off, and then actuate the control by which the engine becomes a real braking power. The driver will learn to gauge the time for using the braking power of the engine so that in coming to a stop, the wheel brakes will only be used at the very end when the engine automatically converts back to normal operation and can be declutched.

Other objects and advantages of the invention as it is applied to differently equipped diesel engines will occur to those skilled in this art and some will become apparent from the following description.

In the drawings:

Fig. 1 is a diagrammatic view showing in cross-section one cylinder of a multi-cylinder four-cycle diesel engine with its inlet and outlet valves and ports, and with a butterfly valve to close off the intake port or manifold, and also showing the control circuit with the main control switch mounted on the brake pedal;

Fig. 1–A is an enlarged detail of the brake pedal with one form of control switch;

Fig. 1–B shows in cross-section the main control switch where it is mounted on the foot throttle pedal;

Fig. 2 is a view similar to Fig. 1 except that the control is mounted on the foot throttle pedal, the fuel shut-off is effected whenever the throttle is closed, and the butterfly in the intake manifold is closed when the operator raises his foot off the pedal face;

In Figs. 3 to 7 the circuitry of the controls is omitted as it can be like that shown in Fig. 1 or 2, or variations of these;

Fig. 4 shows a modification of the device of Fig. 3 having the butterfly valve located on the inlet side of the supercharger, thereby eliminating the relief valve needed in the set-up shown in Fig. 3;

Fig. 5 shows in cross-section one form of arrangement where the invention is applied to a four-cycle diesel engine with a turbo-supercharger;

Fig. 6 is a like view where the invention is applied to a multi-cylinder two-cycle diesel engine with a positive displacement supercharger;

Fig. 7 is a like view where the the invention is applied to a two-cycle diesel engine with a turbo-supercharger;

Fig. 8 shows a modified form of fuel shut-off valve to replace the valve 21 in Fig. 1 or 2, when my invention is used with fuel injection systems where fuel in excess of load requirements is circulated through the injectors and the excess is returned to the fuel tank; and Fig. 9 is a view somewhat diagrammatic in form showing a vehicle incorporating the combination of the present invention.

Figure 3:
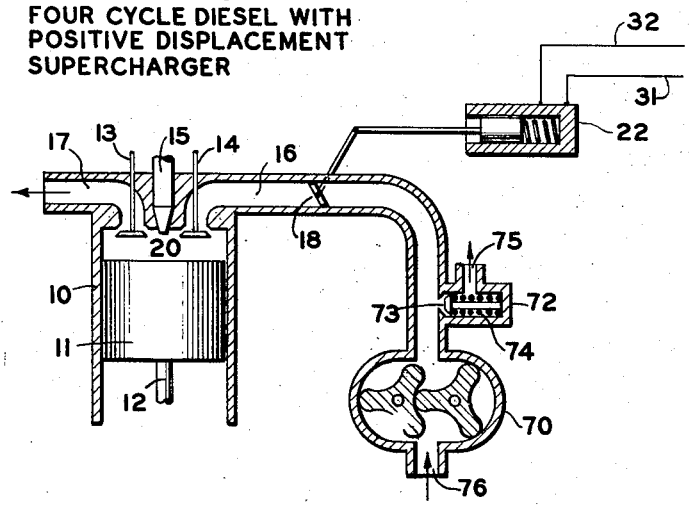
Fig. 3 shows in cross-section one form of arrangement where the invention is applied to a multi-cylinder four-cycle diesel engine using a positive displacement supercharger.

Referring to Fig. 1, the numeral 10 denotes the cylinder block of a diesel engine having multiple cylinders, one of which is shown in this figure in cross-section, having its piston 11 and connecting rod 12. The form of cylinder shown is a valve-in-head having the exhaust valve 13, the inlet valve 14 and the fuel injection nozzle 15. The air necessary to support combustion enters through the inlet manifold 16, and the exhaust or burnt gases leave the cylinder through the manifold 17.

My invention includes placing in the inlet manifold 16 a butterfly valve 18 or some other form of closure means, for substantially closing off any passage of air into the cylinder combustion space 20, when the inlet valve 14 is opened. In this way, by substantially completely shutting off the flow of air into the cylinder the downward stroke of the piston 11 is converted into a suction pump stroke. Because the exhaust valve 13 is also closed and no air is entering through the fuel injection nozzle 15, there is great resistance offered to the downward movement of the piston 11 and this is transmitted to the crankshaft of the engine by means of the connecting rod 12. This, therefore, imposes on the rotation of the engine a definite deterrent or brake and calls on the forward momentum of the vehicle to supply the energy necessary to rotate the engine. With diesel engines as heretofore operated, where there has not been this substantial closure of the inlet manifold 16, the downward stroke of the piston 11 has not met with any substantial resistance. The unobstructed inlet allowed air to flow into the cylinder chamber 20 and out the exhaust with only a slight heat loss. By including the closure valve 18 in the inlet manifold 16, my invention converts the engine into a vacuum pump, and that calls for the forward movement of the vehicle to rotate the engine as a pump when the valve 18 is closed, thereby deriving a substantial braking effect from the engine.

In addition to closing off the flow of any air to the cylinder 20, I prefer to include in the fuel line from the fuel pump a valve 21 which automatically shuts off the fuel to the engine whenever the butterfly valve 18 is closed. This has the beneficial effect, therefore, of not permitting any fuel to be introduced through the fuel injection nozzle 15 and accomplishes at least three benefits. First, it accomplishes a substantial economy in the operation of the vehicle from the standpoint of fuel cost, because any fuel that gets past the pump while coasting is wasted. Second, it avoids fouling up the engine with unburned fuel because, in the absence of compression, there is insufficient heat for ignition. Third, by closing off both air-intake and fuel to the engine it prevents the engine from operating as an engine, thereby further multiplying its braking power. Other features and elements of the combination and their respective functioning in the combination will now be reviewed.

The important and preferred actuation of the butterfly valve 18 and the fuel cut-off valve 21 is set to occur when the driver elects to use the braking effect of the engine. Both valves are arranged to open automatically, and to restore the engine to its normal operating cycle, whenever the engine R. P. M. drops to where it should idle. By that time, of course, the forward movement of the vehicle will have been substantially checked and will be within the easy further control of the braking supplied by the wheel brakes.

One form of control circuit (Fig. 1) which I have found very effective in my invention for controlling the butterfly valve 18 and the fuel valve 21, to achieve the purposes above described, is to provide an electrical circuit to energize a solenoid 22 to close the butterfly valve 18 and a solenoid 23 to close the fuel valve 21. These close whenever the operator of the vehicle places his foot on the hinged brake pedal pad 24 thereby engaging the contacts 25 and closing the circuit to the solenoids 22 and 23. The balance of the circuit to these solenoids includes a connection to the relay or circuit breaker 26, which in most vehicles is already a well-known part of the generator and battery charging circuit.

In my invention I prefer to convert the engine into a brake in the same speed range when the engine's rotation is sufficient to be charging the battery. When the speed of the engine drops to where the generator is not putting out enough current to charge the battery, then the relay 26 will open. I use the opening of the relay 26 to effect a de-energization of the solenoids 22 and 23, which opens the butterfly valve 18 and the fuel valve 21 and restores the diesel engine to its normal operating condition.

The details of the circuitry will be described briefly and include in Fig. 1 a connection to ground at 27 with a battery at 28, a lead 30 to the generator cut-out relay 26 and a lead 40 and 31 to the solenoid 22, then a lead 32, 33 to a manual cut-out switch 34 on the dash by which the operator can, if he chooses, completely suspend the operation of my device. Continuing with the control circuit, there is then the lead 35 which goes to the switch contacts 25 which are closed by the vehicle operator when his foot engages the pedal pad 24. The circuit then passes through the brake lever 36 to a ground at 37. The lead 32 also has a branch 38 to the solenoid 23 and through the lead 40 back to the cut-out relay 26.

A detailed description of the cut-out relay 26 which controls the relay points is not believed necessary because this is a well known device. The generator 42 is rotated by the engine and is used to keep the battery 28 charged. It is when the rotation of the generator 42 increases to a predetermined point that the coil 43 in the relay will move a core 44 downwardly and thereby close the relay points. This core will be released and will move back to open the relay points when the speed of the generator 42 falls below a predetermined point. This cutout point is usually just above the idling speed of the engine. By relating the operation of the butterfly valve 18 and the fuel shut-off valve 21 to the operation of the cutout, I obtain the beneficial braking effects sought in the speed range of the engine where they are most needed.

While the invention has been described and illustrated with the relay controlled in this manner by a unit which is already on all vehicles, it may instead be controlled by a governor of any sort or by any other form of mechanism which will have the effect of separating the equivalent of the relay points 26 whenever the speed of the vehicle drops to where, to prevent the engine from stalling, or dying, the butterfly valve 18 and the fuel valve 21 should be open. Likewise any available source of energy, electric, hydraulic or pneumatic, may be used to actuate the butterfly valve 18 and the fuel valve 21.

In Fig. 1B is shown a form of control switch to be used when the control is mounted on the accelerator pedal 50. It is pivoted at 51 and engages the rod 52 which passes to the fuel feed control mechanism for admitting more or less fuel through the injector nozzles 15 depending upon the speed the operator wishes the engine to run. The control switch, as shown in Fig. 1B, consists of the spring pressed button 53 having the shank 54 with a contacting member 55 on its lower side adapted to engage a contact 56 when it is desired to energize the solenoids 22 and 23 on the butterfly valve 18 and the fuel valve 21, respectively. In the position shown in Fig. 1B the operator is assumed to have his foot or shoe 57 in place on the accelerator pedal. This is the position of the foot when the accelerator is depressed or when the operator wishes the vehicle to coast or free-wheel without compression.

Should the operator desire to get the benefit of the braking with the engine which my invention can provide, he will lift his foot 57 from the face of the accelerator pedal 50 far enough to allow the spring 58 to move the button 53 upwardly, which will have the effect of closing the contacts 55 and 56, which will complete the circuit through the lead 35 to ground 37 through the lead 60. The lead 35 in Fig. 1B goes to the leads 32 and 38 in Fig. 1 which are connected to the two solenoids 22 and 23. With a control switch of the type shown in Fig. 1B, the butterfly valve 18 and the fuel shut-off valve 21 will be closed when the operator lifts his foot off the button 53. Whenever the operator returns his foot to the accelerator pedal, or depresses the button 53, so as to separate the contacts 55—56, the solenoids 22 and 23 will immediately be de-energized and the springs 61 and 62 will return the butterfly valve 18 and the fuel valve 21 each to its open position.

The operation of the device as so far described will be explained. When the vehicle is rolling along the highway and the driver sees ahead that it will be necessary to bring the vehicle to a stop or to slow it down, he has a choice either of allowing the brakes on the wheels of the vehicle to do all of the braking or he may, by means of this invention, employ the engine as a pump to provide a large part of the braking effect. He can, if the control switch 25 is located on the brake pedal pad or near it, depress the pad 24 and in that way energize the solenoids 22 and 23. Closing the butterfly valve 18 in the inlet 16 to the cylinder 20 shuts off any air flow into the engine cylinders, and, closing the fuel valve 21 shuts off any fuel flow to the injection nozzles. This will convert the engine into a pump and will place on the vehicle drive shaft a substantial braking load because it will take considerable force from the moving vehicle to rotate the engine as a pump. Should the operator find that the vehicle has slowed sufficiently and he wishes to pick up speed, he can remove the foot from the pedal pad 24 and the engine will again resume its normal operating cycle as an engine with fuel supplied through the injection nozzle 15 and the air to support combustion entering through the inlet 16.

Assuming that the operator wishes to bring the vehicle to a complete stop and that he wishes to employ the engine as a brake, he will depress the pedal pad 24 and the functioning of the parts will be as follows: The butterfly valve 18 will shut off any flow of air to the cylinders 20 through the inlet 16 and the valve 21 will shut off the flow of any fuel to the engine through the injection nozzles 15. This condition will prevail until the speed of the engine has been reduced to the point where the generator cutout or relay opens the points 26. This will break the circuit to the solenoids 22 and 23 which will open the butterfly valve 18 and the fuel valve 21, and will restore the engine to its normal operating condition. It does this before the engine has had an opportunity to reach so low an R. P. M. that it will not rotate under its own power. In other words, the driver does not "lose" the engine.

When the operator observes that conditions call for him to slow the vehicle or to stop it, he was two choices in using the invention described herein. One choice is to put his foot on the brake pedal depressing the control pad 24 only enough to close the contacts 25, but not enough to apply the wheel brakes. This converts the engine into a brake which slows the vehicle. When he gets to the point where he feels that to complete the stop in time it is necessary also to employ the wheel brakes, he will energize the wheel brakes by further depressing the brake pedal. This will have the effect of using the wheel brakes plus the engine as a pump, and these effects will continue until the vehicle is slowed to where the low engine speed allows the relay contacts 26 to open. The engine then ceases to function as a brake and returns to its normal operating condition. The other choice the operator of the vehicle has where a quick stop is needed is to place the foot on the brake pedal pad 24 closing the contacts 25 thereby converting the engine into a pump to use it as a brake and also to apply force immediately to the brake lever 36 to energize the wheel brakes. This will bring the vehicle to a stop much faster than if the engine were not assisting the wheel brakes in accomplishing the deceleration.

Where the vehicle has the device of my invention with the control arranged on the accelerator pedal (Fig. 1B), the driver will put the engine into operation as a brake by letting up on the treadle 50 of the accelerator and by raising his foot off of it far enough so that the button 53 can rise from the surface of the treadle and close the contacts 55 and 56. This energizes the solenoids 22 and 23 and closes the butterfly valve 18 in the inlet 16 and closes the fuel valve 21.

Where the vehicle has the device of my invention with the control arranged to be effected by the accelerator pedal as shown in Fig. 2, and this is probably the preferred form of arrangement, the control for the fuel shut-off valve 21 is separated from the control for the butterfly valve 18. Each has its own circuit. The fuel valve shut-off circuit is arranged to close whenever the accelerator pedal comes to the "off" position. The butterfly valve closing circuit is arranged to close only when the operator lifts his foot off the accelerator pedal. An advantage of this arrangement is that when the operator wishes the vehicle to coast along with a minimum of resistance from the engine he will leave his foot on the accelerator pedal in the "off" position of the latter. This shuts off the fuel at the valve 21, but leaves the butterfly valve 18 in open position. To close the latter he lifts his foot off the pedal 50 with the result already described.

In Fig. 2 the same reference numerals are used where possible. The numeral 110 represents the fuel pump with a drive 111 from the engine and fuel inlet and outlet 112, 113 respectively. The lever 114 is connected to parts inside the pump which regulate the flow of the fuel depending upon the position of the accelerator pedal 50, connected by link 52 to the lever 114. As shown in Fig. 2 the lever 114 is in the "off" or "closed" position for the fuel allowing only enough fuel to pass to permit the engine to "idle." In this "off" position the lever 114 is in contact with the switch member 115 mounted in the insulated member 116. If the engine is rotating at any speed above idling when the lever 114 makes this contact with 115 the circuit to the fuel shut-off valve 21 will be completed through the leads 117, 118, 119, 40, and 30, and the flow of any fuel to the injector nozzles will be cut off.

The operator may for several reasons find this control more convenient than the one located on the brake pedal. If the slowing down of the vehicle is not to be a complete stop, but is merely to anticipate traffic conditions ahead, the operator is not required to move his foot off of the foot throttle, but can keep it there, allowing the pedal 50 to come back to its "off" position. This shuts off the fuel at the valve 21. For more braking effect he can lift his foot off the pedal 50 to allow the contacts 55 and 56 to close, thereby closing the butterfly valve 18 in the air inlet manifold.

A further advantage in locating the control switch on the accelerator pedal 50 is that in shifting gears, when the shift is on the upside—that is, when the driver is shifting from first to second and from second to third, etc., up to the highest speed, he can use the decelerating effect of the engine as a brake in slowing down the clutch and drive shaft in the transmission by lifting his foot high enough off the accelerator pedal 50 so that the engine is converted into a pump, as already described. When the engine has thus been slowed he can make the shift to the next higher gear in a much shorter time than in the past, as fully explained earlier in this specification.

Another advantage in locating the control switch on the accelerator pedal 50 is that it functions as a sort of "dead-man control." Thus, if the driver loses consciousness or for any other reason removes his foot from the pedal 50, the automatic braking effect of the engine will become into play as explained.

Figure 4:
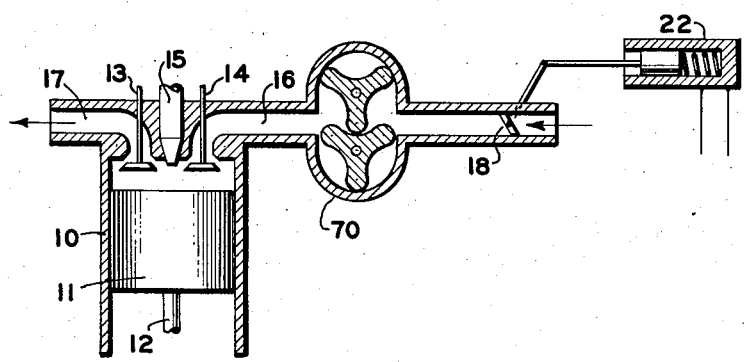

The invention as applied to a four-cycle diesel, having a positive displacement supercharger, is shown in Figs. 3 and 4. In Fig. 3, the butterfly valve 18 is placed between the supercharger 70 and the inlet valve 14. Since the supercharger 70 will continue to rotate when the butterfly valve 18 is closed, a pressure release is necessary. This is provided at 72 where there is a spring pressed valve 73 with its spring 74 and a vent 75 to atmosphere. Whenever the butterfly valve 18 is shutting off the flow of air into the cylinder 20, the flow of air being produced by the blower 70 will exhaust through the valve 73 to the vent 75.

In Fig. 4 I show an alternative arrangement where a positive displacement supercharger is used, and that is to locate the butterfly valve 18 on the inlet side 76 of the blower 70. This enables me to dispense with the relief valve 72 and cuts off the flow of air into the cylinder 20 through the manifold 16.

Figure 5:
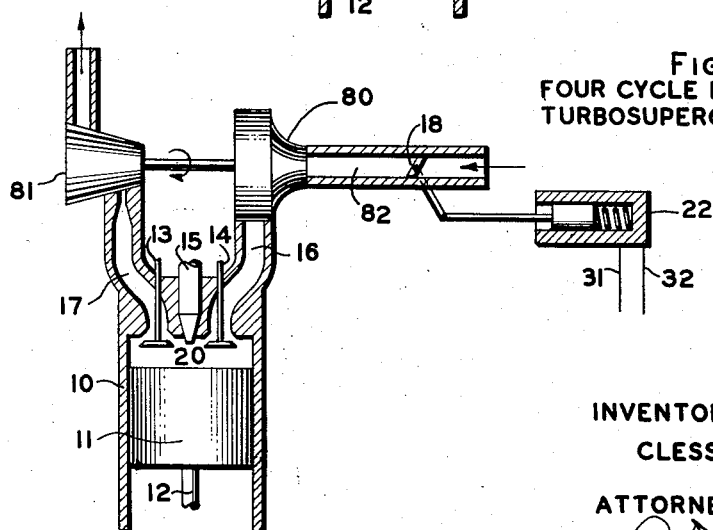

In Fig. 5 I show the invention as applied to a four-cycle diesel with a turbo-supercharger compressor 80. The compressor 80 is driven by the turbine 81 located in the exhaust line 17 and is energized entirely by the flow of the exhaust gases from each cylinder 20 when its valve 13 is open. In this case, the compressor 80 is not a positive displacement type of compressor. I have found it preferable to locate the butterfly valve 18 in the inlet 82 to the compressor housing which is connected to the inlet 16 to the cylinder chamber 20.

In Fig. 6 I have illustrated the application of my invention to a two-cycle diesel having a positive displacement blower 90 connected to the inlet manifold 16 of the engine. In this case the butterfly valve 18 is located between the blower 90 and the inlet port 91 of the cylinder 92. Here as in the case of Fig. 3 I employ a relief valve 72 having the spring pressed valve member 73 with the vent 75. In addition to the butterfly valve 18 closing the inlet manifold 16, I also employ a like valve 93 in the outlet port 17 from the combustion chamber 94. These butterfly valves 18 and 93 may be connected together and operated by the same solenoid 22 because whenever it is necessary for one of the butterfly valves to be closed, it is also required that the other one be closed. It is possible to gain a certain benefit from my invention, even without the butterfly valve 93 in the exhaust manifold 17, although I do get a better result by having both butterfly valves 18 and 93 when using the invention on a two-cycle diesel with a positive displacement blower.

Fig. 7 shows my invention applied to a two-cycle diesel using a turbo-supercharger 80 driven by a turbine 81 and having an inlet manifold 82 into the compressor 80 with the outlet of the compressor connected to the inlet port 16 to the combustion chamber 94 and with the turbine 81 connected to the outlet port 17 from the cylinder. In the inlet port 82 to the compressor 80 is located the butterfly valve 18. And, in the outlet conduit 17 is located the butterfly valve 93. In Fig. 7 each butterfly valve is shown having its own solenoid to actuate it. 22 denotes the one connected to the butterfly valve 18, and 22A the one connected to the butterfly valve 93. In practice, if these butterfly valves are near enough to each other, it is simpler to have one solenoid actuate them both. In the devices shown in Figs. 6 and 7 where the two-cycle engine is employed, the closing of the butterfly 18 and the butterfly 93 has the effect of converting the engine into a pump which requires that it be rotated by the momentum of the vehicle transmitted from the road wheels to the driveshaft and to the crankshaft of the engine. While I have not shown in Figs. 3, 4, 5, 6 and 7 the cut-off to the fuel line, it is to be understood that this is preferred as a part of the system. It is shown and described in Figs. 1 and 2.

It is possible to get the benefit of my invention without the use of the fuel valve cut-off 21, but it is preferable to cut off the flow of the fuel into the cylinders for reasons already fully explained.

One other modification calls for explanation, and that is where my invention is used with fuel injection systems having fuel in excess of the load requirements circulated through the injectors and the excess returned to the fuel tank. In this case the best results are attained by having a cut-off valve in the fuel supply line between the pump and the injectors and another cut-off valve in the fuel return line from the injectors to the tank. These shut off the flow in both these lines when coasting at speeds above the generator cut-out speed. Several beneficial effects follow from this shutting off of both these lines. One is that the fuel in and around the injectors will remain there to serve as a plunger lubricant. Another is that the fuel will not be forced out of the drain line and be replaced by air from cylinder pressure. Air would otherwise replace solid fuel in and around the metering port into the plunger chamber of each injector. Unless solid fuel is maintained at this point of metering into each injector plunger chamber, no fuel will be available to power the engine without a time lag. The extent of this lag would depend on how much solid fuel had to be pumped into the injectors to dispel the air that accumulated while the engine was being motored by the forward inertia of the vehicle.

In applying my invention to an engine having such a fuel injection system, I therefore prefer to employ a cut-off valve in the fuel supply line between the pump and the injector and a cutoff valve in the surplus fuel return line from the injector to the tank. This may be accomplished by separately controlled valves, but for economy it may be done by locating the two cutoff valves in a single housing actuated by a single solenoid or other form of actuator. In Fig. 8 I show one form of such a valve housing 21A which is adapted to use in the devices described and illustrated at 21 in Fig. 1 for all the structures shown in Figs. 1 to 7 inclusive. Fuel from the pump enters the valve housing 21A through the conduit 100 and leaves through the conduit 101. Excess fuel returning to the fuel tank from the injectors enters the valve housing through the housing 102 and leaves through the conduit 103. A single valve body 104 actuated by a single solenoid 105 is fitted into bore 106 into which the conduits 100, 101, 102 and 103 are ported. The valve body 104 is circumferentially grooved at 107 and 108 to align with these ports when the spring 62 is holding the valve body in its open position. When the solenoid is energized it moves the valve body against the right-hand end of the bore 106 and closes the ports. A suitable bleed line 109 allows the valve body to move freely against the end of the bore. This bleed line may be connected anywhere so long as it does not cause complications in the feeding of the fuel. It is shown connected to the drain line back to the tank.

By way of summary, what my invention does is to provide substantially automatic means for converting a free-running diesel engine into a vacuum pump whenever the throttle is closed and the engine is turning over at more than the engine's idling speed. From a safety standpoint this gives the vehicle (*a*) additional braking power, and (*b*) makes possible faster gear shifting on the level as well as on a grade. From an economy standpoint this gives the vehicle's wheel brakes less work to do and so they last longer. It gives fuel economy. And from the driver's standpoint it saves fatigue and gives the driver a control never before possible with diesel-powered vehicles. From the public's standpoint it reduces the risks of injury from runaway trucks.

The foregoing description of different embodiments of my invention is done in compliance with the statute, and is not intended by me as indicating that the combination comprising my invention cannot be practiced by equivalent parts or that I am limiting my invention to the form of the parts used in explaining it.

What I claim as my invention is:

1. An engine control system for an engine of the type having a substantially free-breathing air intake manifold, adapted to convert said engine into a vacuum pump at times when said engine is being rotated by a force other than that produced by the combustion of fuel in its cylinders, including means for substantially closing said air intake manifold at said times during the rotation of said engine; speed-regulated control means arranged to be governed by said engine when its R. P. M. goes above or below a predetermined speed; and means for effecting operation of said control system when desired and when said speed-regulated control means is above said predetermined speed.

2. An engine control system for an engine of the type having a substantially free-breathing air intake manifold and a fuel injection system adapted to convert said engine into a vacuum pump, when said engine is being rotated by a force other than that produced by the combustion of fuel in its cylinders, including means for substantially closing said air intake manifold at said times during the rotation of said engine; means to close the fuel line to said fuel injection system; speed-regulated control means arranged to be governed by said engine when its R. P. M. goes above or below a predetermined speed; and means for effecting operation of said control system when desired and when said speed-regulated control means is above said predetermined speed.

3. A wheel mounted motor vehicle adapted to be propelled through a suitable driving lineup to its wheels by an internal combustion engine of the type in which unthrottled air is introduced therein, said engine having one or more cylinders, with a piston in each cylinder; a combustion chamber therein; means for admitting air into said chamber separately from the fuel and for releasing the products of combustion therefrom; a source of fuel; a driver operated throttle for controlling the admission of fuel to said cylinder; said vehicle being characterized by a control for obtaining a braking effect from said engine on said vehicle when slowing down said vehicle, said control including means for restricting the flow of air into said combustion chamber; means actuated by said driver for activating said last named means whereby the admission of air into said combustion chamber will be substantially stopped so that during said interval of activation said engine is functioning as a vacuum pump under the inertia of the forward movement of said vehicle.

4. A wheel mounted motor vehicle adapted to be propelled through a suitable driving lineup to its wheels by an internal combustion engine of the type in which unthrottled air is introduced therein, said engine having one or more cylinders, with a piston in each cylinder; a combustion chamber therein; means for admitting air into said chamber separately from the fuel and for releasing the products of combustion therefrom; a source of fuel; a driver operated throttle for controlling the admission of fuel to said cylinder; a control regulated by the speed of said engine, and set to change condition at a predetermined point in the engine's speed of rotation; said vehicle being characterized by a control for obtaining a braking effect from said engine on said vehicle when slowing down said vehicle, said control including means for restricting the flow of air into said combustion chamber; means actuated by said driver for activating said last named means, and means for releasing said last named means when said control regulated by the speed of said engine reaches and goes below a predetermined point of speed of rotation, whereby the admission of air into said combustion chamber will be substantially stopped during the interval between the time the driver moves the activating means and the time the speed of the vehicle is arrested to the point where the rotation of the control means goes below its predetermined setting, so that during said interval of time said manifold is closed said engine is functioning as a vacuum pump driven by the forward movement of said vehicle.

5. The device of claim 4 in which said means actuated by said driver for activating said control is mounted on the same foot pedal that operates the throttle for the engine and said means is actuable only when his foot has allowed the throttle to close.

6. The device of claim 4 in which said means actuated by said driver for activating said control is mounted on the same foot pedal that applies the brakes for the vehicle and said means is actuable whenever his foot is applying pressure to said pedal.

7. A wheel mounted motor vehicle adapted to be propelled through a suitable driving lineup to its wheels by an internal combustion engine of the type in which unthrottled air is introduced therein, said engine having one or more cylinders, with a piston in each cylinder; a combustion chamber therein; means for admitting air into said chamber separately from the fuel and for releasing the products of combustion therefrom; a source of fuel; a driver operated throttle for controlling the admission of fuel to said cylinder; a control regulated by the speed of said engine, and set to change condition at a predetermined point in the engine's speed of rotation; said vehicle being characterized by a control for obtaining a braking effect from said engine on said vehicle when slowing down said vehicle, said control including means for restricting the flow of air and fuel into said combustion chamber; means actuated by said driver for activating said last named means, and means for releasing said last named means when said control regulated by the speed of said engine reaches and goes below a predetermined point of speed of rotation, whereby the admission of air and fuel into said combustion chamber will be substantially stopped during the interval between the time the driver moves the activating means and the time the speed of the vehicle is arrested to the point where the rotation of the control means goes below its predetermined setting, so that during said interval of time said manifold and fuel flow are closed off said engine is functioning as a vacuum pump driven by the forward movement of said vehicle.

8. A control system for a diesel-type engine having cylinders; a piston in each; valving means; a fuel supply mechanism for introducing fuel into said cylinders; an inlet for air to support combustion; an outlet for the products of combustion; a speed-responsive governing means connected to said engine for activating a control circuit when the engine is revolving at or above a predetermined speed, said control system being characterized by having the following combined therewith; means for substantially closing said air inlet; means for actuating said closure means; and a control circuit for energizing the last mentioned means when the aforesaid speed-responsive governing means is revolving at or above its said predetermined speed and said fuel supply mechanism is shut off; whereby the flow of air into said cylinders will be substantially stopped and said engine will be converted into a pump for so long as said flow of air is stopped.

9. A control system for a diesel-type engine having cylinders; a piston in each; valving means; a fuel supply mechanism for introducing fuel into said cylinders; an inlet for air to support combustion; an outlet for the products of combustion; a speed-responsive governing means connected to said engine for activating a control circuit when the engine is revolving at or above a predetermined speed, said control system being characterized by having the following combined therewith: means for substantially closing said air inlet; a fuel closure means; means for actuating both said closure means; and a control circuit for energizing the last mentioned means when the aforesaid speed-responsive governing means is revolving at or above its said predetermined speed and said fuel supply mechanism is shut off; whereby the flow of air and fuel into said cylinders will be substantially stopped and said engine will be converted into a pump for so long as said flow or air is stopped.

10. A control system for a diesel-type engine having cylinders, a piston in each, valving means, a fuel supply mechanism for introducing fuel into said cylinders, an inlet for air to support combustion, an outlet for the products of combustion, a speed-responsive governing means connected to said engine for activating a control circuit when the engine is revolving at or above a predetermined speed, said control system being characterized by having combined therewith: means for substantially closing said air inlet; an auxiliary fuel shut-off valve; means for actuating said closure means and said auxiliary fuel shut-off valve; and a control circuit for energizing the last-mentioned means when the engine is revolving at or above its said predetermined speed and said fuel supply mechanism is shut off; whereby the flow of air and fuel into said cylinders will be substantially stopped and said engine will be converted into a pump for so long as said flow of air is stopped.

11. A control system for a diesel-type engine having cylinders, a piston in each, valving means, a fuel supply mechanism for introducing fuel into said cylinders, a driver actuated control therefor, an inlet for air to support combustion, an outlet for the products of combustion, a speed-responsive governing means connected to said engine for activating a control circuit when the engine is revolving at or above a predetermined speed, said control system being characterized by having combined therewith: means for substantially closing said air inlet; an auxiliary fuel shut-off valve; means for actuating said auxiliary fuel shut-off valve when said driver actuated control is in its "off" position; means for actuating said closure means independently of said last named means; and control circuits for energizing said two last-mentioned means selectively or together when the engine is revolving at or above its said predetermined speed; whereby the flow into said cylinders of air and fuel or fuel only will be substantially stopped and said engine will be converted into a pump for so long as said flow of air is stopped.

References Cited in the file of this patent

UNITED STATES PATENTS

| | | |
|---|---|---|
| 1,940,712 | Ertz | Dec. 26, 1933 |
| 2,395,748 | Mallory | Feb. 26, 1946 |

FOREIGN PATENTS

| | | |
|---|---|---|
| 299,026 | Germany | July 11, 1929 |

UNITED STATES PATENT OFFICE

CERTIFICATE OF CORRECTION

Patent No. 2,876,876                                                           March 10, 1959

Clessie L. Cummins

It is hereby certified that error appears in the printed specification of the above numbered patent requiring correction and that the said Letters Patent should read as corrected below.

Column 4, line 71, strike out "the", second occurrence; column 9, line 3, for "become" read -- come --; column 13, line 4, for "or air" read -- of air --.

Signed and sealed this 21st day of July 1959.

(SEAL)

Attest:

KARL H. AXLINE                                                 ROBERT C. WATSON
Attesting Officer                                           Commissioner of Patents